I. LEHMAN, DEC'D.
H. STERN & H. J. SCHLOSSER, EXECUTORS.
UNIVERSAL JOINT.
APPLICATION FILED DEC. 20, 1915.
1,247,290.
Patented Nov. 20, 1917.
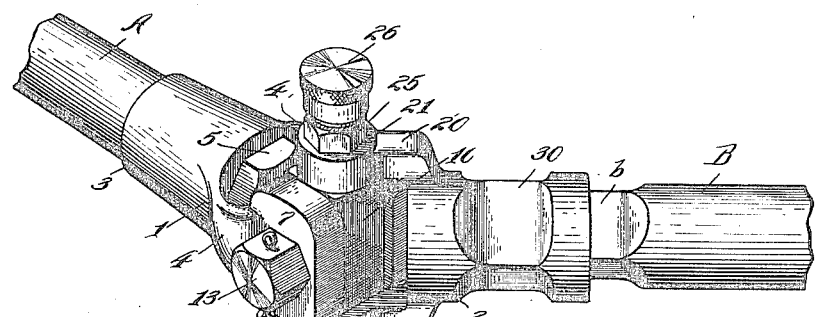
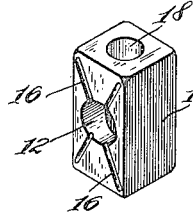
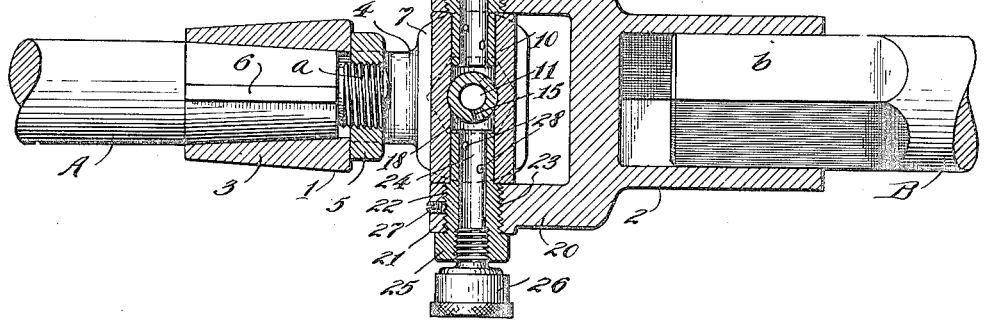
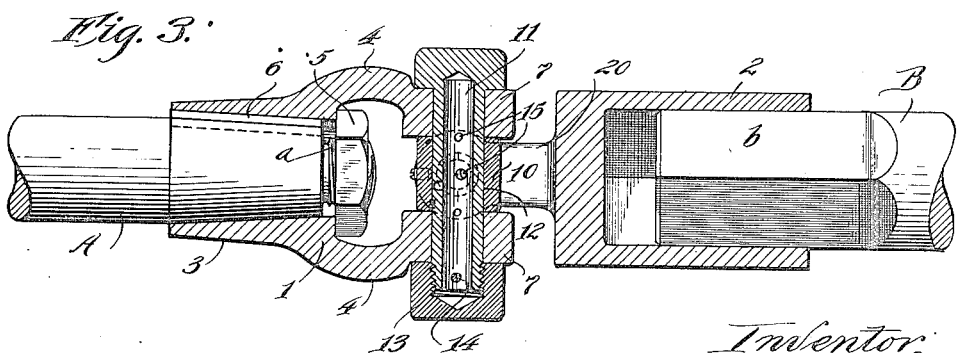
Inventor,
Isador Lehman
Dec'd
By Hull, Smith, Brock & West
Attys.

UNITED STATES PATENT OFFICE.

ISADOR LEHMAN, OF CLEVELAND, OHIO; HERMAN STERN AND HARRY J. SCHLOSSER, EXECUTORS OF SAID ISADOR LEHMAN, DECEASED, ASSIGNORS TO ARNOLD L. STEINFELD AND EDWIN STEINFELD, BOTH OF NEW YORK, N. Y.

UNIVERSAL JOINT.

1,247,290.  Specification of Letters Patent.  Patented Nov. 20, 1917.

Application filed December 20, 1915. Serial No. 67,735.

*To all whom it may concern:*

Be it known that I, ISADOR LEHMAN, a citizen of the United States, residing at Cleveland, in the county of Cuyahoga and State of Ohio, have invented a certain new and useful Improvement in Universal Joints, of which the following is a full, clear, and exact description, reference being had to the accompanying drawings.

This invention relates to improvements in universal joints; and it has for its object to provide a joint of this character that is highly efficient and durable, yet simple of construction and economical of production. The invention has as a further object to provide a constant and thorough lubrication of the working parts of the joint. Also, to provide a construction that is very rigid and substantial and wherein the power transmitting element between the forks of the joint is thoroughly braced to withstand the strains to which it is subjected.

Further objects comprehended by the invention are the provision of a joint of the aforesaid character that may be easily and quickly disassembled for the purpose of inspection and replacement of parts; and to confine the wearing of the joint, as far as practicable, to a single element that may be cheaply and conveniently replaced.

The above objects, and others which will become apparent as this description proceeds, are attained in the construction illustrated in the accompanying drawing, and although I will proceed to specifically describe the embodiment of the invention illustrated in the drawing, I wish to be understood as not limiting myself to the structural details thereof further than is required by the terms of the annexed claims, and is rendered necessary by the state of the prior art.

In the drawing, Figure 1 is a perspective view of my improved universal joint; Fig. 2 is a longitudinal section of the same; Fig. 3 is a similar view at right angles to Fig. 2; and Fig. 4 is a perspective of the block constituting the element through which power is transmitted from fork to fork of the joint.

A and B represent shaft sections that are connected by my universal joint, the member 1 of the joint having connection with the shaft section A, and the member 2 with section B.

The member 1 constitutes a fork and comprises a hub 3 from one end of which extend the branches 4. The hub 3 is provided with a tapered bore within which the correspondingly shaped end of the shaft section A fits, the extreme end of the shaft being reduced and threaded at *a* for the application of a nut 5, which serves to clamp the member 1 securely to the shaft. The member is locked against rotation upon the shaft by means of a key 6. It will be observed, especially from Fig. 3, that the branches 4 are bulged outward immediately beyond the end of the hub 3 to allow ample working room for the application of the nut 5. Beyond the zone of the nut, the branches approach each other and terminate in plates 7, having smooth inner bearing surfaces.

A block 10, that is substantially square in cross section and of a length substantially equal to the length of the plates 7, is journaled between said plates upon a tubular bolt 11, the block having a transverse bore 12 for the accommodation of the bolt. A cap 13, in the form of a nut, is applied to the threaded end of the bolt 11, and is held thereon against turning by the cotter pin 14. Prior to the application of the cap 13, the tubular bolt may be filled with a suitable lubricant, which finds its way through the apertures 15 of the bolt, to the various bearing surfaces and working parts of the joint. It will be observed that certain of these apertures 15 radiate through the shell of the bolt in the plane of the engaging surfaces of the block and plates 7. It will be further noted upon an inspection of Fig. 4, that the sides of the block are provided with radial lubricant distributing grooves 16. It is obvious from this that the engaging surfaces of the block 10 and plates 7 will be constantly supplied with the lubricant. Attention is called to the fact that the bolt 11 constitutes a very firm tie between the ends of the branches 4 of the forked member 1, thus effectually holding such branches against any possible separation. The block 10 is shown as having a longitudinal bore 18 that bisects the bore 12. In some modifications of my invention, however, set forth in certain of the claims, it is unessential that the bore 18 extends through the block—so far as such modifications are concerned, recesses extending inward from the ends of the block would be sufficient. Such an alternative is too obvious to require illustration.

The member 2 is also forked, and its branches 20 extend out over the ends of the block 10 where they terminate in cylindrical bosses 21, having threaded apertures 22 that are in axial alinement with each other and, when the parts are assembled, with the longitudinal bore 18 of the block 10. Contained within the threaded apertures of the bosses 21, are the threaded portions 23 of tubular trunnion members 24 which extend into the longitudinal bore 18, the outer ends of the trunnion members being provided with polygonal heads 25, for the application of a wrench. The outer ends of the bores of the tubular trunnion members are threaded for the application of the threaded shanks of grease cups 26. Set screws 27 are threaded through the sides of the bosses 21 and engage the threaded portions 23 of the trunnion members to lock them against turning. Lubricant may be introduced into the bore 18 through the grease cups 26, and a part thereof will enter the tubular bolt 11 through certain of the apertures 15, thus to replace the lubricant that has found its way out through other of the apertures 15 and between the engaging surfaces of the block 10 and plates 7. It will be understood, of course, that a grease cup may be fitted into the head of the bolt 11, if such be found desirable, and supply the interior of the bolt with lubricant direct therefrom. This, however, is a mechanical expedient and forms no part of my invention and it is deemed unnecessary to illustrate it. The inner ends of the trunnion members 24 may be perforated, as shown at 28, in order to thoroughly lubricate their bearing surfaces. The hub 30 of the member 2 is provided with a square socket for the reception of the squared end b of the shaft section B, thus providing a slip joint connection between the shaft sections, such being desirable in certain well known installations. Where such a joint is not required, it is obvious that the hub of the member 2 may be provided with a tapered bore, like that of the hub of the member 1, for the reception of the tapered end of a shaft section, sufficient clearance being provided between the branches 20 of the member 2, and the adjacent face of the block 10, to permit the presence of a nut. Other common forms of couplings may be substituted for the foregoing without affecting my invention.

Each end of each of the plates 7 is curved on a radius from the center of the bolt 11, so that when the shaft sections are turned so much at an angle to each other as to cause one branch of the member 1 to enter between the branches of the member 2, the same may rock with freedom therein, and without danger of engaging the latter branches.

The block 10 may be made of a material more susceptible to wear than the members 1 and 2, the trunnion members 24, or bolt 11. In such an event, in the use of the joint, the block 10 will be the only part that will require replacement; and the same, being of a very simple design and comprising only a small amount of material, may be replaced at a very slight expense, and with very little difficulty. The sturdy design of the block, and the fact that it is so securely supported from end to end between the plates 7 assures maximum service therefrom.

Having thus described my invention, what I claim is:—

1. A universal joint comprising an element having a bore, a forked member the branches whereof embrace said element, said branches having apertures in alinement with said bore, a tubular member that is open at one end and extends through the apertures and bore, a cap for closing the open end of said tubular member and arranged to engage one branch of the forked member, said tubular member having an abutment at its opposite end for engagement with the other branch, the tubular member having also an opening whereby a lubricant contained within the tubular member may be distributed to the bearing surfaces of the element and member, and a second forked member between whose branches the aforesaid element is pivoted on an axis at right angles to the aforesaid tubular member.

2. A universal joint comprising an element having a bore, a forked member the branches whereof embrace said element, said branches having apertures in alinement with said bore, the element and branches having coöperating bearing surfaces, a tubular member that is open at one end and extending through the apertures and bore, a cap for closing the open end of said tubular member and arranged to engage one branch of the forked member, said tubular member having an abutment at its opposite end for engagement with the other branch, the tubular member having also openings whereby a lubricant contained within the tubular member may be distributed to the bearing surfaces of the aforesaid branches, element, and tubular member, and a second forked member between whose branches the aforesaid element is pivoted on an axis at right angles to said tubular member.

3. A universal joint comprising an element having a bore, a forked member the branches whereof embrace said element, said branches having apertures in alinement with said bore, a tubular member extending through the apertures and bore, means for retaining a lubricant within said tubular member, said member having openings whereby lubricant contained within the tubular member may be distributed to the bore of the element, a second forked member whose branches embrace the aforesaid element at right angles to the branches of the first mentioned member, and pivotal connections between the branches of the second forked member and the element, the aforesaid element having ducts through which the lubricant may be conveyed from its bore to said pivotal connections.

4. A universal joint comprising an element having a bore, a forked member the branches whereof embrace said element and have apertures in alinement with the bore thereof, a tubular bolt extending through said apertures and bore, means for retaining a lubricant within the tubular bolt, said bolt having openings through which its interior may communicate with the aforesaid bore of the element, the element having a second bore which bisects the first at substantially right angles thereto and opens through the ends of the element, a second forked member the branches whereof embrace the ends of the element and have apertures alining with the second bore of the element, tubular trunnions extending through said apertures and into the said second bore of the element, and lubricant dispensing devices communicatively connected to the tubular trunnions.

5. A universal joint comprising an element having opposed bearing surfaces and a bore extending through said element and opening through said bearing surfaces, the bearing surfaces of said element having grooves extending from the bore, a forked member the branches whereof have opposed bearing surfaces for coöperation with the bearing surfaces of the element and having apertures in alinement with the bore thereof, a tubular bolt extending through the apertures and bore, means for retaining a lubricant within the tubular bolt, said bolt having openings through which the lubricant may be distributed to the bore of the element, the element having a second bore which bisects the first at substantially right angles thereto and opens through the ends of the element, a second forked member the branches whereof embrace the ends of the element and have apertures alining with the second bore of the element, tubular trunnions extending through said apertures and into the said second bore of the element, and lubricant dispensing devices communicatively connected to the tubular trunnions.

In testimony whereof, I hereunto affix my signature in the presence of two witnesses.

ISADOR LEHMAN.

Witnesses:
R. L. BRUCK,
H. K. BELL.

Copies of this patent may be obtained for five cents each, by addressing the "Commissioner of Patents, Washington, D. C."